June 12, 1956 M. MERMELSTEIN 2,750,149
AUTOMOBILE LIFTING DEVICE
Filed Oct. 27, 1953 2 Sheets-Sheet 1
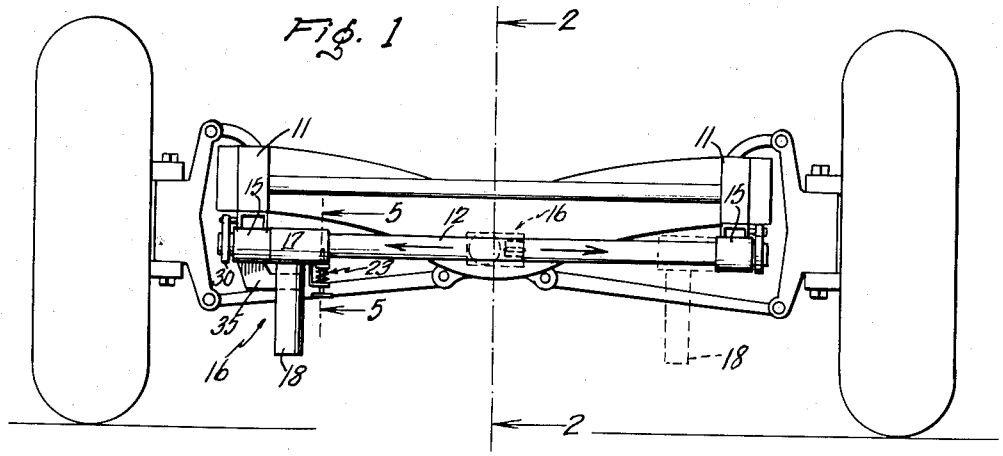
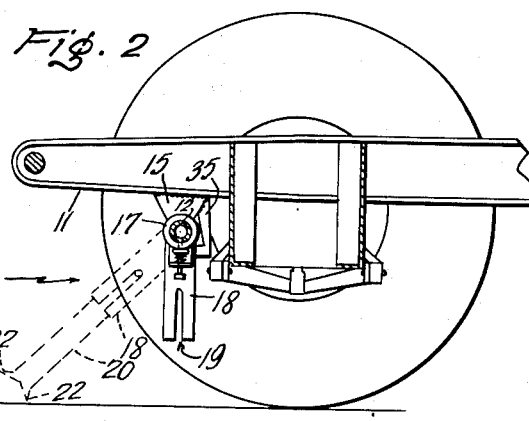
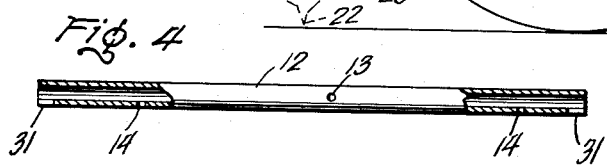
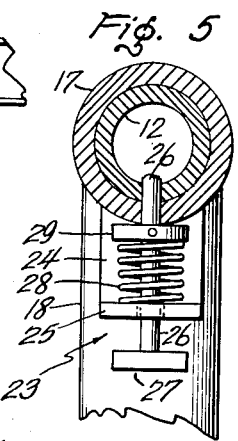
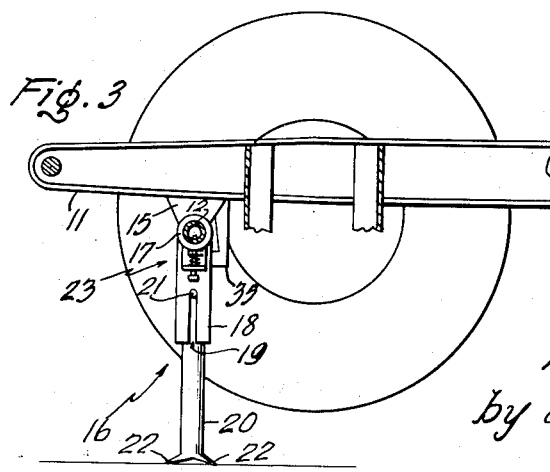
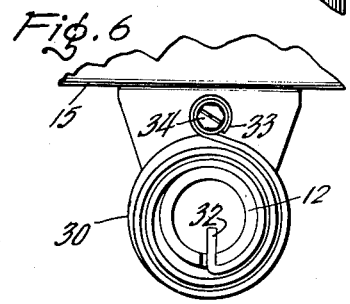
Inventor
MORRIS MERMELSTEIN
by Andros and Smith
His Attorneys June 12, 1956 — M. MERMELSTEIN — 2,750,149
AUTOMOBILE LIFTING DEVICE
Filed Oct. 27, 1953 — 2 Sheets-Sheet 2
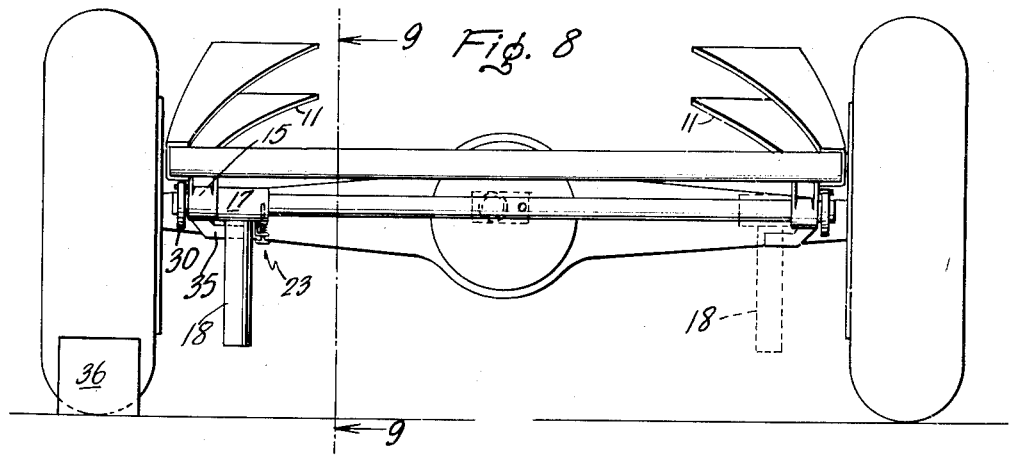
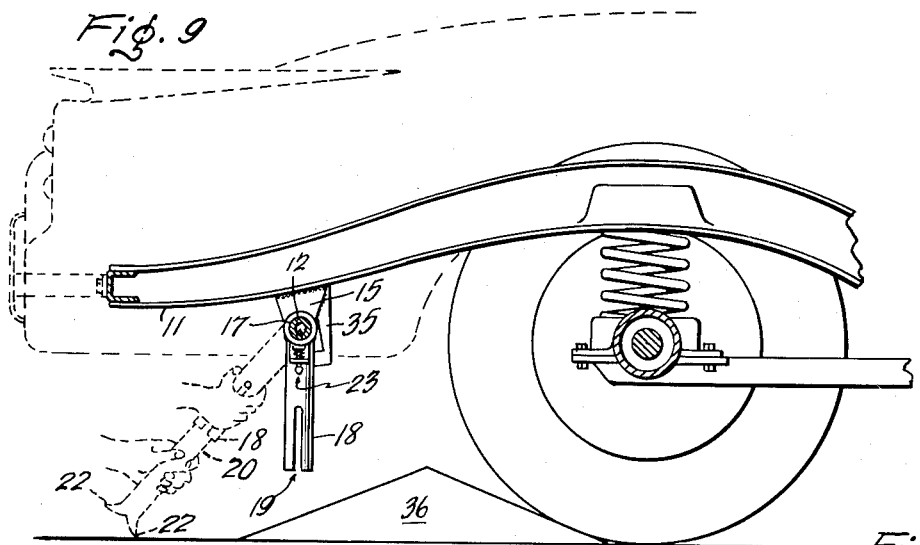
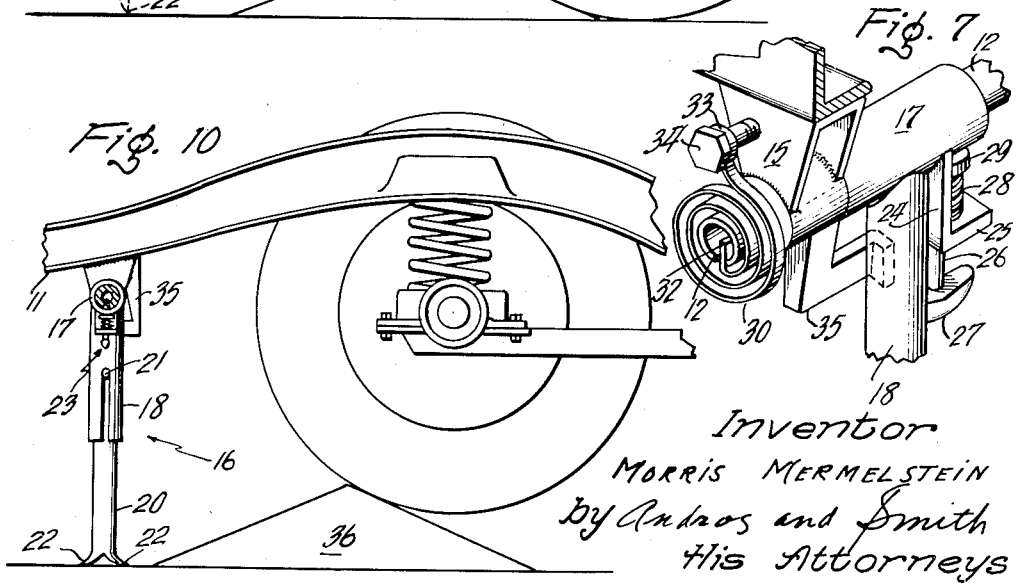
Inventor
Morris Mermelstein
by Andros and Smith
His Attorneys

United States Patent Office 2,750,149
Patented June 12, 1956

2,750,149

AUTOMOBILE LIFTING DEVICE

Morris Mermelstein, Schodack Center, N. Y.

Application October 27, 1953, Serial No. 388,616

9 Claims. (Cl. 254—86)

This invention relates to an improved type of vehicle lifting device. More particularly, it pertains to a device, or so-called jack arrangement, adapted to be secured to the frame of an automobile in a manner such that the vehicle and frame, together with one, or at least two of the vehicle wheels can be raised clear of the ground surface when the jack portion of the car is lowered to operative position and the vehicle set in motion, and the provision of such a device is a principal object of the invention.

I am well aware that various types of so-called jacks of this general character have heretofore been suggested in the patented literature and elsewhere, but where they are not cumbersome, complex and expensive to manufacture, they are not readily adaptable for modern automobiles and would otherwise not function to produce the advantages and new results provided by the present invention.

It is, therefore, also a further and general object of my invention to overcome the disadvantages and difficulties attendant upon earlier devices and to provide a novel type of jack arrangement that is economic of manufacture, simple, yet sturdy and durable of construction, quick and positive in operation, and which readily can be installed on the frame of automobiles being made ready for market as standard equipment as well as for automobiles of more recent origin already on the market.

More specifically, it is an object of the invention to provide such a device comprising an elongated bridging member, suitable means on opposite ends of such member for securing the same to the frame of an automobile, and a jack pivotally mounted along the member between such means and adapted to be lowered into angular ground-gripping position, whereby the vehicle and frame can be elevated, and an adjacent vehicle wheel, or wheels, raised clear of the ground surface when the vehicle is moved against the jack until the latter assumes a substantially vertical position.

Even more specifically, it is an object of the invention to provide a rotatable, elongated, bridging member of a length at least sufficient to span opposite sides of the vehicle frame across an end thereof and having spaced-apart, angularly disposed openings located therein centrally and laterally thereof, a bearing for each end of the bridging member in which the same is rotatable to be secured to opposite side portions of the frame, a jack slidably and pivotally mounted along the member between the bearings, means on the jack engageable and disengageable with a central opening in the member to hold the jack in an up-raised inoperative position and to permit the same to be lowered to an operative position, such means being similarly engageable and disengageable with one of the lateral openings, and when so engaged rendering the jack rotatable with the bridging member, and spring-tensioning means on the member downwardly to draw the jack into angular, ground-engaging operative position when the first named means on the jack is engaged with one of the lateral openings in order that the vehicle and frame can be elevated and an adjacent vehicle wheel as well as both wheels can be raised clear of the ground when the vehicle is moved against the lowered jack until the latter is substantially vertically disposed.

Other specific objects of the invention are the provision of such a device in which releasable means, preferably a spring-actuatable plunger, are adapted to connect the jack and bridging member to hold the jack in up-raised inoperative position; in which spring-tensioning means, preferably a spiral spring, is utilized normally to urge the free end of the jack downwardly, when released, into angular ground-engaging position; in which the jack preferably comprises a slidable and pivotal bearing section that is freely swingable short of contact with the ground surface, and an extension section telescopically engageable therewith adapted angularly to contact the ground surface; and stop means, preferably a depending lug on the bearing, extending into the path of pivotal movement of the jack.

Other objects of the invention will in part be obvious and will in part appear hereinafter.

The invention accordingly comprises the features of construction, combination of elements, and arrangement of parts, which will be exemplified in the construction hereinafter set forth and the scope of the application of which will be indicated in the claims.

For a fuller understanding of the nature and objects of the invention reference should be had to the following detailed description taken in connection with the accompanying drawings, in which:

Fig. 1 is a front elevational view of the lower chassis section of an automobile illustrating a preferred form of my invention mounted thereon;

Fig. 2 is a transverse sectional view taken along the lines 2—2 of Fig. 1 and looking in the direction of the arrows with additional portions of the jack shown in dotted line position;

Fig. 3 is a view somewhat similar to Fig. 2 showing a vehicle wheel in up-raised position;

Fig. 4 is a view, partly in section, of a preferred type of elongated, apertured, rotatable bridging member;

Fig. 5 is a view of the jack engaging and disengaging means, partly in section, with a portion of the jack section broken away, taken along the lines 5—5 of Fig. 1;

Fig. 6 is an end view of a spiral spring-tensioning means shown mounted on the rotatable bridging member and bearing, the latter being shown partly broken away;

Fig. 7 is a fragmentary perspective view of Figs. 4, 5 and 6;

Fig. 8 is a rear elevational view of the lower portion of the chassis of the automobile illustrating my invention mounted in position thereon;

Fig. 9 is a transverse sectional view, taken along the lines 9—9 of Fig. 8 and looking in the direction of the arrows, depicting the manner in which the jack is brought into operative position, which view may also be referred to in order to understand the manner in which the jack is brought into operative position in connection with the invention when mounted on the front of the vehicle; and Fig. 10 is a view similar to Fig. 3 showing the rear wheels in up-raised position.

Referring now more particularly to the drawings, there is shown in Figs. 1 through 3 the conventional front portion of the chassis and wheel arrangement of a modern type of automobile, and these parts need no further detailed description. Suffice it to say that these parts are connected to side frames 11 on which my invention should also be mounted. Preferably, my invention comprises a rotatable, elongated bridging member 12 of a length at least sufficient to span opposite sides of the frame 11 across the front end. This member has a plurality of spaced-apart angularly disposed openings 13 and 14 therein centrally and laterally thereof respectively, the function of which will appear more fully hereinafter.

A bearing 15 is provided for each end of the member 12 in which the latter preferably is rotatable, and these bearings are secured to opposite side portions of the frame 11 by welding or in any other suitable manner such as by bolting the same thereto.

A jack arrangement, indicated generally at 16, is mounted on the bridging member 12. Preferably, the jack comprises a bearing portion 17 that is slidable and pivotal along the member 12 between the bearings 15 and is freely swingable short of contact with the ground surface. This portion of the jack preferably has a tubular extension 18 provided with a slot indicated at 19.

An extension section, or leg, 20 is adapted removably to be mounted within the tubular section 18. The leg section has stop pins 21 that can be placed in any suitable position therein, and these are adapted to enter the slot 19. A plurality of aligned holes can be placed in the leg section 20 removably to receive the pin 21 thereby providing selected length adjustments for the leg. The free end of the leg preferably is provided with sharp ground-gripping prongs 22. When the ground-engaging leg is made removable, it preferably is carried in the trunk of the automobile until ready for use.

Mounted on the slidable and pivotal jack section 17—18 is a releasable holding and securing means indicated generally at 23 (see Fig. 5). Preferably, this comprises an angle bracket 24 through the foot 25 of which passes a reciprocable plunger pin 26 having a handle 27 thereon. The pin passes through a compression spring 28 which is held under tension by a collet 29 abutting the bearing section 17. The pin 26 also passes through a hole in the bearing provided therefor and is adapted to engage and disengage with the angularly spaced-apart openings 13 and 14 in the bridging member 12. The complete function of this member will be more fully described in connection with the operation of the device hereinafter.

On either end of the bridging member 12, laterally of the bearing members 15, where the same passes therethrough is a spiral spring 30. At its ends the bridging member 12 preferably has slots 31 through which passes one end 32 of the spiral spring 30. The other end 33 of the spiral spring 30 is secured by a stud 34 in the bearing 15.

A stop member 35 depends from the bearing 15 and extends laterally inwardly in the path of the tubular section 18 of the jack member.

The foregoing embodiment of the invention has been described in connection with the mounting of the same on the front frame section of the vehicle as shown in Figs. 1 through 6. A similar structure is mounted on the rear frame section of the vehicle as shown in Figs. 8 through 10. Since it is intended that each automobile is to be equipped with two such devices suitably attached to any portion of the frame, there is no need further to describe the same in connection with Figs. 8 through 10 since the parts are identical and similar reference numerals have been applied to the various parts. However, in order to elevate the rear end of an automobile, a further accessory in the form of an inclined plane or block diagrammatically shown at 36 should be used, and this should also preferably be carried in the trunk of the automobile together with the leg section 20. The reason for the use of such a block will readily be understood because of the function of the differential mechanism in the rear end of the automobile. It is therefore necessary to use such a block under the vehicle wheel to be elevated to provide traction therefor.

In operation the device is very simple. When not in use the tubular section 18 is rotated to a horizontal position centrally of the bridging member 12 since the bearing section 17 is pivotally mounted thereon. When so positioned, the pin 26 automatically locates itself in the centrally located opening 13 and this portion of the device is then substantially concealed underneath the automobile. If a tire should go flat, or it is otherwise desirable to raise the front or rear of the automobile, it is but necessary for the operator to reach underneath the frame, grasp the handle 27, pull it toward himself against the action of the spring 28 until the pin 26 is disengaged from the opening 13, and permit the tubular section to swing downwardly to a vertical position. At this point it would be well to note a safety feature of the device. That is to say, should the release means accidentally become disengaged while driving, there is no danger in striking obstructions because the tubular section 18 of the jack will remain in a freely swingable position short of the ground surface. From its central position the jack section 17—18 can be moved to the right or left along the bridging member 12 since it is slidably mounted thereon. If, for example, it is desirable to raise the right front end of the automobile as shown in Fig. 1, the tubular section 18 of the jack will be moved in that position against the adjacent bearing. Upon reaching such position the plunger pin 26 automatically will locate itself with slight manipulation in the opening 14 at the bottom of the bridging member 12. The operator in the meantime obtains the leg section 20 of the jack from the trunk of the car and reaches downwardly to grasp the tubular section 18 of the jack to rotate it upwardly. Since the pin 26 is engaged in the opening 14 of the bridging member, upward rotation of the jack section 18 will be against the action of the spiral spring 30. The operator then slips the leg 20 into the tubular section 18 (as illustrated in Fig. 9) and upon releasing the same the tension upon the spring 30 will cause the coupled jack section to come into ground-engaging position, and the prongs 22 will tend to bite into the ground surface. The operator then steps into the driver's seat, starts the motor and advances the vehicle a foot or two until the jack is in substantially vertical position, thereby immediately elevating the adjacent wheel above the ground surface. Since the stop member 35 extends laterally inwardly into the path of the jack, the vehicle will not override this position. When the tire has been changed, the vehicle is reversed until the wheel engages the ground surface. The leg section is removed to be returned to the trunk, and the tubular jack section 18 is moved centrally of the bridging member 12 and returned to its horizontal inoperative position where it is so held by virtue of the pin 26 against engaging the opening 13. Obviously, either wheel can be so raised or, if desired, the entire front end or rear end of the automobile can be lifted with both wheels clear of the ground surface by positioning the jack member centrally of the bridging member. With respect to the raising of the rear end of the vehicle the operation is the same as above described except that a block 36 should be used.

The invention above described has many advantages. Besides being a pivotal and slidably mounted jack, it produces the new results above described to raise either or both wheels clear of the ground. Two such jacks could be carried on a bridging member in a tandem or independent arrangement. Also, any member of openings 13 and 14 can be provided if desired. Furthermore, any other spring tensioning means than the spiral spring 30 can be utilized and otherwise positioned to perform the function of the device above described. In fact, under proper circumstances and with care, such spiral spring could be omitted and the bridging member could be held in fixed position. There are other advantages such as, for example, the fact that the rear jack section 18 could be made into a trailer hitch and either the front or rear section could also be used as a sleeve to receive the stud shaft of a snowplow.

It will thus be seen that the objects hereinbefore set forth may readily and efficiently be attained, and since certain changes may be made in the above construction and different embodiments of the invention could be made without departing from the scope thereof, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described my invention what I claim as new and desire to secure by Letters Patent is:

1. An automobile vehicle lifting device to be connected to the side frame in spaced relation to the axles and springs, comprising an elongated bridging member of a length at least sufficient to span opposite sides of said frame across an end thereof; a bearing for each end of said member for securing the same to opposite side portions of said frame; and a jack slidably and pivotally mounted along and around the longitudinal axis of said member between said bearings said jack pivotally raised and secured into inoperative position and lowered into angular operative position adjacent opposite ends of said bridging member, whereby an end of said vehicle and frame can be elevated, and one vehicle wheel, when the jack is slidably moved adjacent said wheel, can be raised clear of said ground when said vehicle is moved against said lowered jack until the latter is substantially vertically disposed.

2. An automobile vehicle lifting device to be connected to the side frame in spaced relation to the axles and springs, comprising an elongated bridging member of a length at least sufficient to span opposite sides of said frame across an end thereof; a bearing for each end of said member for securing the same to opposite side portions of said frame; a jack slidably and pivotally mounted along and around the longitudinal axis of said member between said bearings, said jack pivotally raised and secured into inoperative position and lowered into angular operative position adjacent opposite ends of said bridging member, whereby an end of said vehicle and frame can be elevated, and one vehicle wheel, when the jack is slidably moved adjacent said wheel, can be raised clear of said ground when said vehicle is moved against said lowered jack until the latter is substantially vertically disposed; and releasable means connecting said jack and said bridging member together to hold said jack in upraised inoperative position.

3. An automobile vehicle lifting device to be connected to the side frame in spaced relation to the axles and springs, comprising an elongated bridging member of a length at least sufficient to span opposite sides of said frame across an end thereof; a bearing for each end of said member for securing the same to opposite sides of said frame; a jack mounted on the bridging member and adapted slidably to be moved and pivotally to be positioned at any point along and around the longitudinal axis of said member between said bearings; releasable means connecting said jack and bridging member together for holding said jack in an upraised inoperative position between said bearings; and spring means on said member normally to urge the free end of said jack downwardly, when released, into angular position, whereby said vehicle and frame can be elevated, and one vehicle wheel, when the jack is slidably moved adjacent said wheel, can be raised clear of said ground when said vehicle is moved against said jack until the latter assumes a substantially vertical position.

4. An automobile vehicle lifting device to be connected to the side frame in spaced relation to the axles and springs comprising a rotatable, elongated, bridging member of a length at least sufficient to span opposite sides of said frame across an end thereof and having spaced-apart, angularly disposed openings located therein centrally and laterally thereof respectively; a bearing for each end of said member in which the same is rotatable to be secured to opposite side portions of said frame; a jack slidably and pivotally mounted along and around the longitudinal axis of said member between said bearings; means on said jack engageable and disengageable with a central opening in said member to hold said jack respectively in an upraised inoperative position and to permit the same to rotate to a lowered operative position, said means being similarly engageable and disengageable with one of said lateral openings, and when so engaged, rendering said jack rotatable with said bridging member; and downwardly tensioning means on said member to draw said jack into angular, operative position when said first named means on said jack is engaged with one of said lateral openings, whereby an end of said vehicle and said frame can be elevated, and one vehicle wheel, when the jack is slidably moved adjacent said wheel, can be raised clear of said ground when said vehicle is moved against said lowered jack until the latter is substantially vertically disposed.

5. An automobile vehicle lifting device to be connected to the side frame in spaced relation to the axles and springs comprising a rotatable, elongated, bridging member of a length at least sufficient to span opposite sides of said frame across an end thereof and having spaced-apart, angularly disposed openings located therein centrally and laterally thereof respectively; a bearing for each end of said member in which the same is rotatable to be secured to opposite side portions of said frame; a jack slidably and pivotally mounted along and around the longitudinal axis of said member between said bearings; means on said jack engageable and disengageable with a central opening in said member to hold said jack respectively in an upraised inoperative position and to permit the same to rotate to a lowered operative position, said means being similarly engageable and disengageable with one of said lateral openings, and when so engaged, rendering said jack rotatable with said bridging member; downwardly spring-tensioning means on said member to draw said jack into angular, operative position when said first named means on said jack is engaged with one of said lateral openings, whereby an end of said vehicle and said frame can be elevated, and one vehicle wheel, when the jack is slidably moved adjacent said wheel, can be raised clear of said ground when said vehicle is moved against said lowered jack until the latter is substantially vertically disposed; and stop means on one of said bearings cooperatively associated with said jack to block the latter against overriding said vertical position.

6. A device of the character defined in claim 5, and further characterized in that said jack comprises a slidable and pivotal bearing section that is freely swingable short of contact with said ground surface; and an extension section telescopically engageable therewith and, when so engaged, angularly contacts said ground surface.

7. A device of the character defined in claim 5, and further characterized in that said first named means on said jack for engagement and disengagement with said openings in said rotatable bridging member includes a manually controllable, spring-actuatable plunger.

8. A device of the character defined in claim 5, and further characterized in that said spring-tensioning means includes at least one spiral spring wound adjacent one end of said rotatable bridging member, one end of said spring being secured to said member and the other end of said spring being secured to an adjacent bearing.

9. A device of the character defined in claim 5, and further characterized in that said stop means includes a depending lug on said bearing, laterally extending inwardly thereof in the path of pivotal movement of said jack.

References Cited in the file of this patent

UNITED STATES PATENTS

| | | |
|---|---|---|
| 1,530,429 | Sjolander | Mar. 17, 1925 |
| 1,580,209 | McCarty | Apr. 13, 1926 |
| 2,206,623 | Barr | July 2, 1940 |
| 2,226,577 | Parks | Dec. 31, 1940 |
| 2,634,941 | Eckert | Apr. 14, 1953 |